United States Patent [19]
Rhodenizer

[11] Patent Number: 6,131,712
[45] Date of Patent: Oct. 17, 2000

[54] BRAKE PEDAL ACTUATOR FOR BLEEDING BRAKES

[76] Inventor: Wade Rhodenizer, R. R. #1, Bridgewater, Nova Scotia, Canada, B4V 2V9

[21] Appl. No.: 09/120,146

[22] Filed: Jul. 21, 1998

[51] Int. Cl.$^7$ ....................................... B60T 11/00
[52] U.S. Cl. ........................................... 188/352; 188/3 H
[58] Field of Search .................... 188/3 H, 352, 188/353, 265, 112 R; 267/170, 175, 249, 250; 74/532, 481, 482; 254/DIG. 5; 24/522, 525

[56] References Cited

U.S. PATENT DOCUMENTS

| | | | |
|---|---|---|---|
| 878,786 | 2/1908 | Dunham | 74/482 |
| 1,681,192 | 8/1928 | McBride . | |
| 1,707,113 | 3/1929 | Christ . | |
| 1,877,367 | 9/1932 | Seppmann . | |
| 1,907,835 | 5/1933 | Langbein . | |
| 2,171,832 | 9/1939 | Hoeppner | 267/71 |
| 2,513,850 | 7/1950 | Digman . | |
| 2,694,318 | 11/1954 | Smith et al. . | |
| 2,932,504 | 4/1960 | Avery . | |
| 3,125,898 | 3/1964 | Maples et al. . | |
| 3,226,997 | 1/1966 | Malloy | 74/482 |
| 3,722,266 | 3/1973 | Dunham . | |
| 3,910,135 | 10/1975 | Phillips . | |
| 4,788,879 | 12/1988 | Ulrich | 74/481 |
| 5,012,689 | 5/1991 | Smith . | |
| 5,031,729 | 7/1991 | Wittkop et al. . | |
| 5,201,488 | 4/1993 | Hadbavny . | |
| 5,299,668 | 4/1994 | Youngers et al. . | |
| 5,417,127 | 5/1995 | Bueti et al. . | |
| 5,722,645 | 3/1998 | Reitter | 267/177 |

*Primary Examiner*—Michael Mar
*Assistant Examiner*—Xuan Lan Nguyen
*Attorney, Agent, or Firm*—Mario D. Theriault

[57] ABSTRACT

A brake pedal actuator having a tubular member and a stem telescopically mounted in the tubular member. A J-shaped hook is mounted on the stem for attachment to a segment of a steering wheel of a vehicle. A pedal clamping mechanism is mounted on the tubular member for attachment to the brake pedal of the vehicle. A handle is mounted on the tubular member for allowing a manual pushing and pulling of the brake pedal by a user standing outside the vehicle. In another aspect of the invention, the actuator has a wedge-type locking sleeve and nut affixed to the clamping mechanism for selectively locking the mechanism and for preventing a loosening or clapping of the latching mechanism when the brake pedal is manually actuated back and forth. In a further aspect of the present invention, the brake pedal actuator comprises a ring which is movably mounted on the stem and restrictively positional along the stem. When the brake pedal actuator is in use in a still mode, the position of the ring and the end of the tubular member are usable for monitoring a creeping movement of a brake pedal under a load from the actuator.

20 Claims, 4 Drawing Sheets

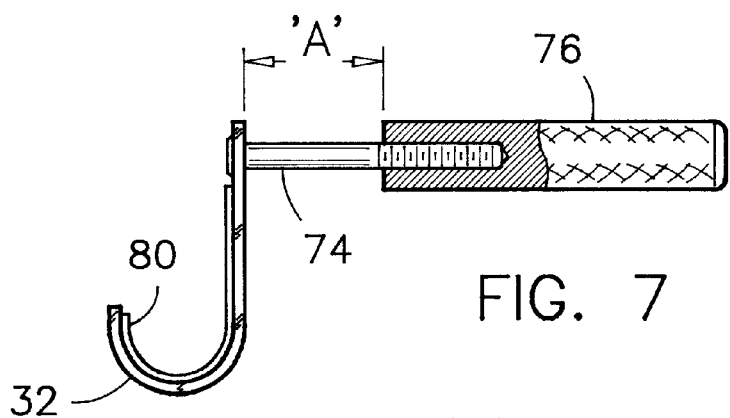
FIG. 7
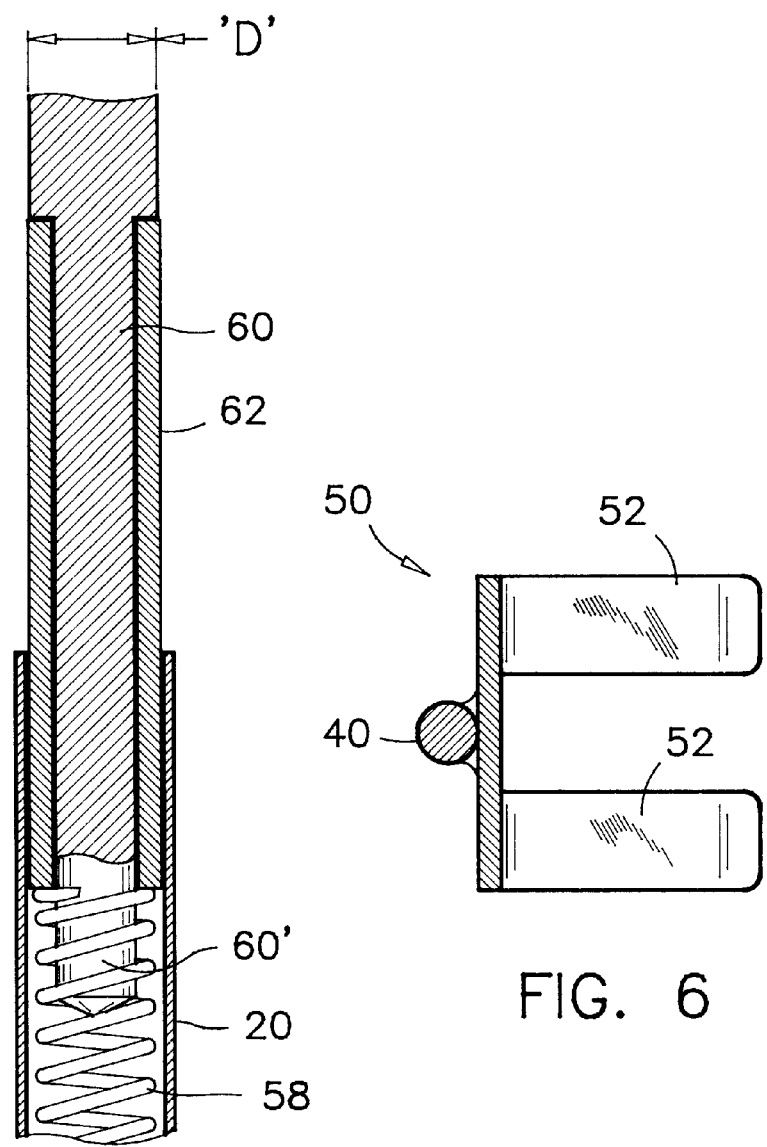
FIG. 6
FIG. 5

BRAKE PEDAL ACTUATOR FOR BLEEDING BRAKES

FIELD OF THE INVENTION

This invention pertains to a tool for assisting auto mechanics in bleeding the brake system of a vehicle, and more particularly, this invention pertains to a brake pedal actuator which has a handle and a brake pedal clamping mechanism to allow a mechanic to manually apply push and pull movements on a brake pedal while standing outside the vehicle.

BACKGROUND OF THE INVENTION

Pedal depressing apparatus have been known for some time in the field of tools for auto mechanics. These tools are used generally to hold down vehicle pedals like accelerators, brake pedals and clutch pedals allowing a mechanic to move away from the area and alleviating the necessity of a helper while performing work on the vehicle.

Pedal depressing tools of the prior art are believed to belong to two broad groups. The tools of the first group use a telescoping shaft and are either mechanically or hydraulically actuated. The tools are used to depress and maintain a vehicle's pedal in a fixed position relative to the seat, steering wheel or dash board of the vehicle. Examples of pedal depressing tools of the first group are disclosed in the following patent documents:

U.S. Pat. No. 1,707,113 issued on Mar. 26, 1929, to E. F. Christ;
U.S. Pat. No. 1,877,367 issued on Sep. 13, 1932 to A. B. Seppmann;
U.S. Pat. No. 1,907,835 issued on May 9, 1933 to H. W. Langbein;
U.S. Pat. No. 5,012,689 issued on May 7, 1991 to S. R. Smith;
U.S. Pat. No. 5,031,729 issued on Jul. 16, 1991 to J. Wittkop et al.;
U.S. Pat. No. 5,201,488 issued on Apr. 13, 1993 to D. L. Hadbavny;
U.S. Pat. No. 5,299,668 issued on Apr. 5, 1994 to W. L. Youngers et al.;
U.S. Pat. No. 5,417,127 issued on May, 23, 1995 to A. Bueti et al.;

Another type of brake pedal depressing tools of the prior art comprises a telescoping rod having a spring mounted therein for continually urging a brake pedal down or forward. These tools are mounted generally between the pedal and the dash board or to the seat of the vehicle. Some of the tools of this second type are disclosed in the following documents:

U.S. Pat. No. 1,681,192 issued on Aug. 21, 1928 to A. C. McBride;
U.S. Pat. No. 2,513,850 issued on Jul. 4, 1950 to J. E. Digman;
U.S. Pat. No. 2,694,318 issued on Nov. 16, 1954 to A. M. Smith, Sr. et al.,
U.S. Pat. No. 2,932,504 issued on Apr. 12, 1960 to T. L. Avery;
U.S. Pat. No. 3,125,898 issued on Mar. 24, 1964 to F. M. Maples et al.;
U.S. Pat. No. 3,722,266 issued on Mar. 27, 1973 to J. C. Dunham;
U.S. Pat. No. 3,910,135 issued on Oct. 7, 1975 to A. C. Phillips;

It will be appreciated that the bleeding of a brake system of a vehicle often requires two, three or sometimes more actuations of the brake pedal to completely evacuate the air from the brake fluid lines and brake pistons. The initial push of the brake pedal is easily done using one of the tools of the prior art. The second and subsequent actuations of the brake pedal, however, often requires the removal and re-installation of the tool of the prior art in order to allow the brake pedal to return to a release position. This removal and re-installation of the tool can represent a laborious task especially when the brake job is performed while the vehicle is raised on a hoist for example.

Although most of the tools of the prior art deserve undeniable merits, there is no known manual tool that allows a back-and-forth actuation of the brake pedal of a vehicle. There is no known prior art tool that has the appropriate structure to allow an auto mechanic working on a hoisted vehicle to repeatedly apply and release the brakes while standing outside the vehicle.

SUMMARY OF THE INVENTION

In the present invention, however, there is provided a brake pedal actuator that has a handle and a pedal clamping mechanism to allow the manual pushing and pulling of the brake pedal by a user standing outside the vehicle. The brake pedal actuator of the present invention also comprises numerous additional features to assist an auto mechanic for performing a safe and effective brake job on a vehicle.

In a first aspect of the present invention, there is provided an elongated tubular member having a foot plate affixed at a first end thereof and an opened second end. An elongated stem is telescopically mounted inside the opened second end of the tubular member. A spring is mounted inside the tubular member between the foot plate and the elongated stem for urging the stem towards the opened second end. The elongated stem has at least one hole through a mid-region thereof A J-shaped hook having a bolt protruding therefrom is removably affixed to the stem with the bolt engaged in the hole through the stem. This J-shaped hook has a hook dimension substantially a same size as a typical cross-section dimension of a steering wheel of a vehicle for attachment to a segment of the steering wheel.

The brake pedal actuator of the present invention also has a latching mechanism affixed to the tubular member for retaining the foot plate to the brake pedal. A first handle is affixed to the tubular member and extends perpendicularly from the tubular member. The actuator of the present invention further has a second handle affixed to the elongated stem and extending perpendicularly from the stem.

A first advantage of this aspect of the brake pedal actuator of the present invention is that when the foot plate is held against the brake pedal of a vehicle, the second handle is usable for engaging the J-shaped hook onto a steering wheel of that vehicle, and the first handle is usable by an auto mechanic for manually pumping the brake pedal while standing outside the vehicle.

In accordance to another aspect of the brake pedal actuator of the present invention, the latching mechanism further comprises an elongated rod rigidly connected to a latch plate and extending near the second end of the tubular member. The tubular member has a pair of guiding members for movably guiding the rod there-along. The latching mechanism also comprises another spring connected to the rod and to one of the guiding members for urging the rod and the latch plate toward the second end of the tubular member. The latching mechanism further comprises a palm-type handle mounted on the end of the rod, and a finger gripping member mounted on one of the guiding members.

The advantage of this arrangement is that a user of the brake pedal actuator of the present invention is able to operate the pedal latching mechanism from a distance from the brake pedal. The user of the brake pedal actuator of the present invention is thereby able to install the actuator without having to extend his/her hand near the floor of the vehicle for securing the foot plate of the actuator to the brake pedal.

In accordance with another aspect of the present invention, the latching mechanism further comprises a wedge-type locking sleeve affixed to one of the guiding members for selectively locking the rod of the mechanism relative to the tubular member. This locking sleeve is particularly advantageous for preventing a loosening or clapping of the latching mechanism when the brake pedal is manually actuated back and forth.

In accordance to yet another aspect of the present invention, the brake pedal actuator comprises a ring movably mounted on the elongated stem and being restrictively positional along the stem. Therefore, when the brake pedal actuator is in use and in a still mode, the position of the ring and the second end of the tubular member are usable for monitoring a creeping movement of a brake pedal under a load from the actuator. The positional ring is therefore usable as a quality gauge to indicate that a brake job has been properly effected, or to warn an auto mechanic that a brake job needs further verification before the vehicle is released to a client.

For all these reasons and others which will be explained later, the brake pedal actuator of the present invention is easily installed, convenient to use, and provides a means by which an auto mechanic can visually confirm a quality brake job.

BRIEF DESCRIPTION OF THE DRAWINGS

Having briefly explained the general concept of the brake pedal actuator of the present invention and some of the advantages thereof, the structure of this device will be described herein in greater details with reference to the accompanying drawings, in which:

FIG. 5 is an enlarged cross-section view of the brake pedal actuator showing the engagement of the guide sleeve inside the tubular member;

FIG. 6 is an enlarged plan view of the latch plate of the latching mechanism as seen along line 6 in FIG. 3;

FIG. 7 is an enlarged side view of the J-shaped hook attachable to the round stem of the brake pedal actuator;

DETAILED DESCRIPTION OF THE PREFERRED EMBODIMENT

Figure 1:
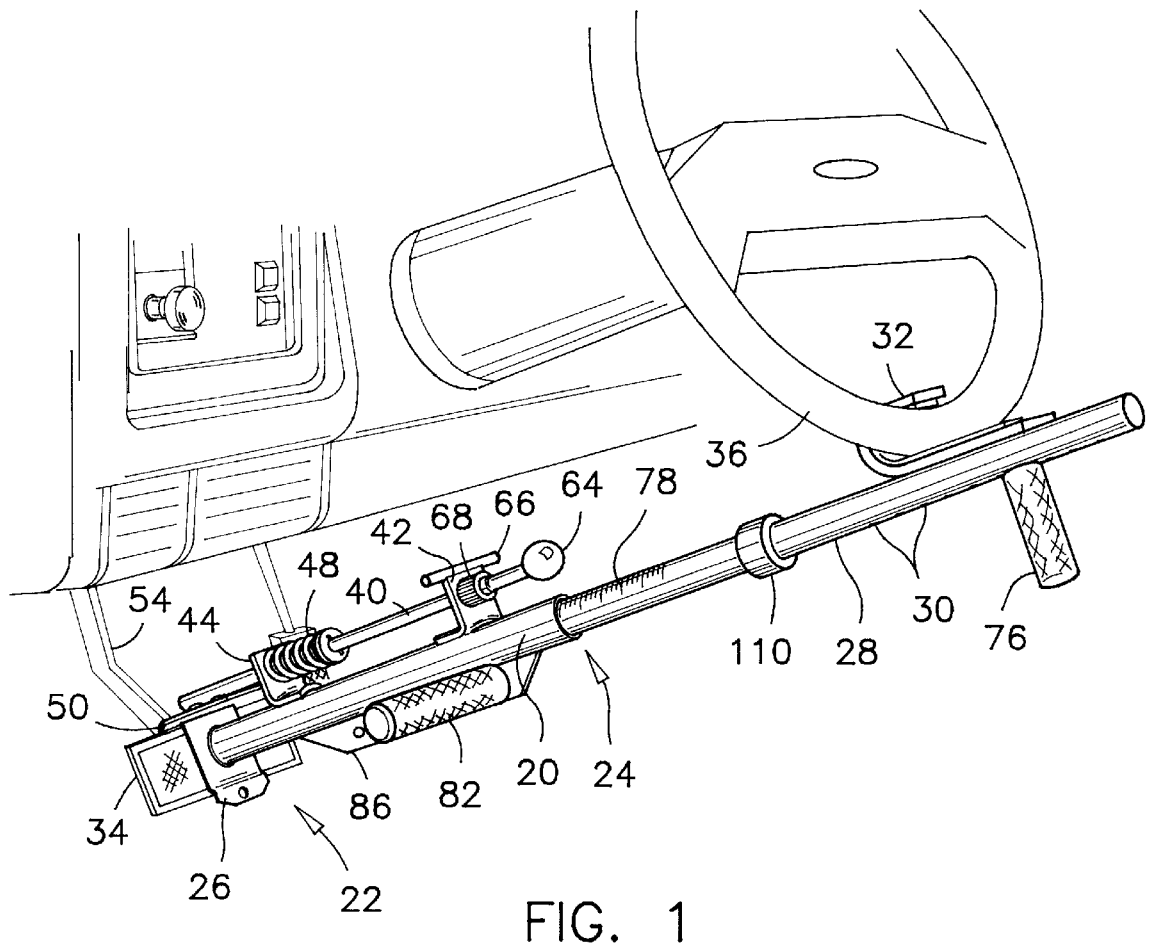
FIG. 1 is a left side and near end perspective view of the brake pedal actuator of the preferred embodiment installed in a vehicle.
Figure 2:
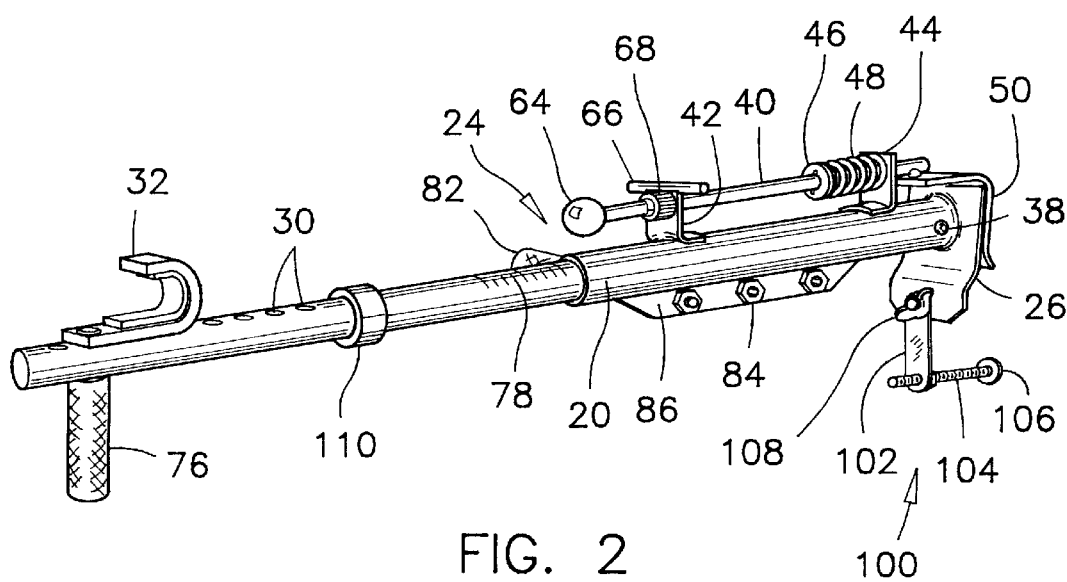
FIG. 2 is a right side and near end perspective view of the brake pedal actuator of the preferred embodiment.
Figure 3:
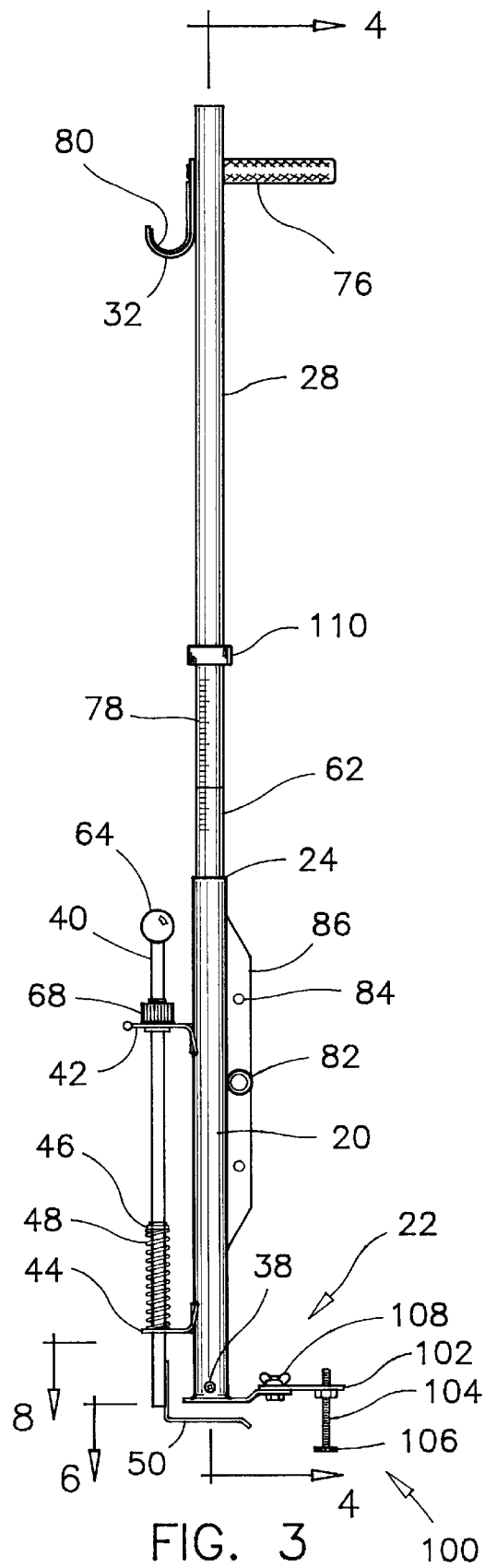
FIG. 3 is a left side view of the brake pedal actuator of the preferred embodiment having an optional depth gauge mounted thereon.

The brake pedal actuator of the preferred embodiment is illustrated in its entirety in the accompanying drawings and in particular in FIGS. 1, 2 and 3. In use, the brake pedal actuator of the preferred embodiment is preferably mounted between the steering wheel and the brake pedal of a vehicle, as illustrated in FIG. 1, for applying a constant pressure on the brake pedal and for allowing a manual operation of the brake pedal during the bleeding of the brake's hydraulic system of that vehicle.

The brake pedal actuator of the preferred embodiment comprises a round tubular member 20 having a far end 22, a near end 24 and a foot plate 26 affixed to the far end in a perpendicular relation with the longitudinal axis thereof A round stem 28 is telescopically mounted inside the tubular member 20, and extends through the near end 24 of the tubular member 20. The round stem 28 has a series of spaced-apart holes 30 through the diameter thereof, and a J-shaped hook 32 is affixed thereto through one of these holes 30.

The foot plate 26 is normally placed against the front surface of the brake pedal 34, and the J-shaped hook 32 is engaged with a lower segment of the steering wheel 36 of the vehicle. The foot plate 26 is preferably held against the brake pedal 34 by means of a latching mechanism. This latching mechanism comprises a rod 40 guided along the tubular member 20 in the openings of first and second holed brackets 42,44 which are affixed to the tubular member 20. A washer or annular collar 46 is affixed to the rod 40, and a first coil spring 48 is mounted between the annular collar 46 and the second holed bracket 44 for urging the rod 40 toward the near end 24 of the tubular member 20. At the far end of the rod 40 there is provided a latch plate 50 having a U-shaped form defining a pair of finger-like tabs 52, as illustrated in FIG. 6, for extending behind the brake pedal 34 on each side of the brake pedal lever 54. The first coil spring 48, the rod 40 and the finger-like tabs 52 cooperate for pulling the foot plate 26 against the brake pedal 34 and for keeping the foot plate 26 in contact with the brake pedal 34 during the actuation of the brake pedal as will be explained later.

Figure 4:
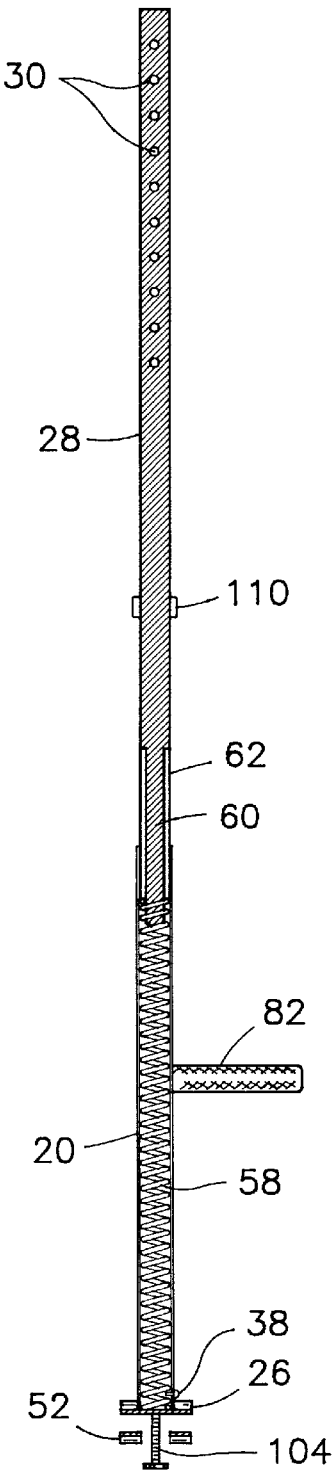
FIG. 4 is a longitudinal cross-section view of the brake pedal actuator along line 4—4 in FIG. 3.
Figure 8:
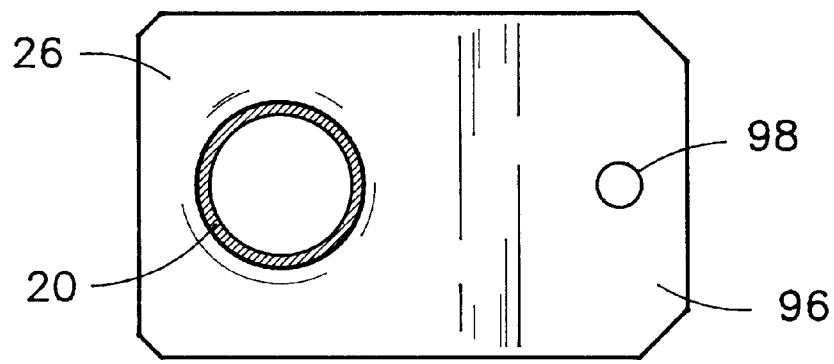
FIG. 8 is an enlarged plan view of the foot plate of the brake pedal actuator, as seen along line 8 in FIG. 3.
Figure 9:
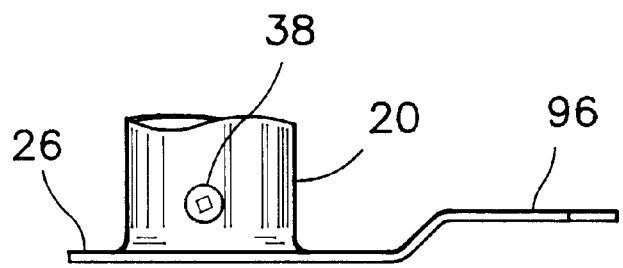
FIG. 9 is a side view of the foot plate illustrated in FIG. 8.

Referring particularly to FIGS. 4 and 5, the round stem 28 is telescopically removably mounted inside the tubular member 20, and is urged toward the near end 24 by a second compression spring 58 mounted inside the round tubular member 20. The round stem 28 has a portion 60 of reduced diameter and a guide sleeve 62 mounted on that portion 60 for guiding the round stem 28 inside the tubular member 20. The guide sleeve 62 is preferably made of Teflon™ or other plastic material having a low coefficient of friction. The guide sleeve 62 has an outside diameter which corresponds to a loose sliding fit inside the tubular member 20. The stem 28 has a diameter which is equal or preferably slightly smaller than the diameter of the guide sleeve 62. The length of the guide sleeve 62 is less than the length of the portion of reduced diameter 60 such that a lower end 60' of the portion of reduced diameter extends beyond the sleeve 62 and into the compression spring 58 for aligning the longitudinal axis of the spring 58 with the round stem 28 when the brake pedal actuator of the preferred embodiment is being used.

The free length of the compression spring 58 is preferably at least about 2 inches (50 mm) less than the inside length of the tubular member 20, such that an initial engagement of the round stem 28 inside the tubular member is at least this dimension. The workable length of the compression spring 58 is preferably about 8 inches (20 cm), and this spring has a preferred spring rate of between about 5 to 7.5 lbs/inch (0.9–1.3 kg/cm). A spring of such force and displacement has been found appropriate for allowing an easy installation of the pedal actuator by hand, for properly pushing the brake pedals of most motor vehicles and for not applying excessive stresses on the steering wheels of these vehicles. One example of a preferred compression spring 58 has the following specifications: It has a free length of 14 inches (35.5 cm), an overall diameter of ¾ inch (19 mm); is made of piano wire having a diameter of 0.090 inch (2.3 mm), has ground ends and 61.6 active coils. The second spring 58 is preferably held inside the tubular member 20 by means of a screw 38 threaded through the far end of the tubular member 20, between the bottom and the second from the bottom coils of the spring 58, as partly illustrated in FIG. 4.

The installation of the brake pedal actuator of the preferred embodiment is effected by pushing the latch plate 50 away from the foot plate 26 using a palm-type handle 64 on the near end of the rod 40, for enlarging a gap between the foot plate 26 and the latch plate 50. A round bar 66 is mounted transversely relative to the rod 40, on the first holed bracket 42 for conveniently providing a finger gripping means when pushing the handle 64 and actuating the brake pedal latching mechanism. For this reason, it will be appreciated that the distance between the round bar 66 and the palm-type handle 64 is less than a hand's length when the latch plate 50 is up against the foot plate 26.

The tabs 52 are then inserted behind the pedal 34, and the handle 64 is released. The first spring 48 preferably has a workable length of at least about 2 inches (50 mm). The displacement of the latch plate 50 is also preferably at least about 2 inches (50 mm). The preferred first spring 48 has a flee length of about 3½ inches (89 mm), an overall diameter of about ¾ inch (19 mm), and a spring rate of about between 5–10 lbs/inch (0.9–1.8 kg/cm).

The brake pedal latching mechanism further comprises an optional wedge-lock collar 68 affixed to the first holed bracket 42 and acting upon the rod 40 for optionally locking the rod 40 in a fixed position and preventing the latch plate 50 from moving relative to the foot plate 26. The wedge-lock collar 68 is better illustrated in a cross-section view thereof in FIG. 11. The wedge-lock collar 68 comprises a taper split sleeve 70 enclosing the rod 40 and affixed to the first holed bracket 42. A taper nut 72 is threaded onto the split sleeve 70 for selectively pressing or wedging the split sleeve 70 against the rod 40 and locking the rod 40 relative to the first holed bracket 42 and the tubular member 20. The wedge-lock collar 68 is particularly advantageous for maintaining a strong hold on a brake pedal 34, and for preventing the foot plate 26 from clapping against the brake pedal 34 when the actuator of the preferred embodiment is used to actuate the brake pedal back and forth.

When the brake pedal latching mechanism is secured to the brake pedal 34, the round stem 28 is thereafter compressed inside the tubular member 20 and the J-shaped hook 32 is engaged with the steering wheel 36.

Referring now to FIGS. 1–3, 5 and 7, the J-shaped hook 32 is adjustably mounted on the round stem 28. The J-shaped hook 32 has a threaded stud 74 extending outwardly at right angle from the longer leg of the hook. The threaded stud 74 has a diameter which fits loosely into one of the holes 30 in the round stem 28 and is retained in that hole by a nut 76.

The nut 76 is preferably a straight-handle-type nut such that it is easily removable for changing the position of the J-shaped hook 32 according to the distances between the brake pedals and the steering wheels of various types of vehicles. The straight-handle-type nut 76 is also advantageous for compressing the round stem 28 inside the tubular member 20 when engaging the J-shaped hook 32 on the steering wheel 36. The length of the threaded stud 74 is sufficient for engagement into the full length of the threaded hole inside the handle 76 plus a distance 'A' which is slightly more than the diameter 'D' of the round stem 28 as illustrated in FIG. 5. This loose fit of the stud 74 through the round stem 28 is advantageous for allowing the J-shaped hook 32 to pivot sideways and to maintain a good grip on the steering wheel 36 when the steering wheel is unintentionally turned, or when the brake pedal actuator is lightly forced sideways during an operation thereof.

The round stem 28 has graduations 78 thereon for indicating the remaining compression in the second spring 58. The installation of the J-shaped hook 32 along the stem 28 is preferably effected such that there is at least 6 inches (15 cm) of compression left in the spring 58 when the actuator of the preferred embodiment is installed in a vehicle. The use of the graduations 78, with the above recommendation when installing the J-shaped hook 32 prevents the bottoming of the compression spring 58 during the pulling of the brake pedal with the actuator of the preferred embodiment. It will be appreciated that although the graduations 78 are illustrated as those on a common ruler, a single printed mark on the stem 78 would suffice for indicating an ideal placement of the J-shaped hook 32 along the stem 28.

The inside surface of the J-shaped hook 32 is preferably lined with a strip of soft padding material 80 such that the use of the brake pedal actuator of the preferred embodiment does not scratch the steering wheel when the steering wheel is made of cellulosic plastic for example.

Another important aspect of this invention is that the brake pedal actuator of the preferred embodiment also comprises a handle 82 which is adjustably mounted on the tubular member 20. The handle 82 is mounted on the tubular member 20 for manually pushing and pulling the tubular member 20 and the brake pedal 34. The handle 82 is particularly advantageous for pumping the brake pedal 34 without having to climb into the vehicle or without having to remove the actuator from its position. An auto-mechanic working on brake system of the vehicle is able to reach the handle 82 from the driver-side door of the vehicle and to manually pump the brake pedal 34 for causing air accumulated in the brake circuit to move toward a wheel cylinder and to be evacuated by subsequent bleeding of the cylinder in a manner known in the art.

The handle 82 has a bolt-like member (not shown) which is threaded in one of several threaded holes 84 in a flat bar 86 affixed longitudinally on its edge to the underside of the tubular member 20. The handle 82 is thereby positional at various locations along the tubular member 20 to satisfy a particular make of vehicle or the preference of a user.

The handles 76 and 82 are removable from the round stem 28 and the tubular member 20 respectively, and the stem 28 is removable from the tubular member 20, such that the brake pedal actuator of the preferred embodiment is stowable in a compact arrangement in a tool chest, and is shippable from the factory to a buyer in a relatively small package.

Referring now particularly to FIGS. 2,3,8 and 9, there is illustrated therein the foot plate 26 and an optional depth gauge assembly 100 mounted thereon. The foot plate 26 has an offset portion 96 opposite the rod 40, and a hole 98 through the offset portion 96 for optionally receiving and holding a depth gauge assembly 100. The depth gauge assembly 100 is optionally used for holding a brake pedal, a clutch pedal or an accelerator pedal at a set height from the floor of the cab of the vehicle, for the purpose of properly adjusting the height of that pedal.

The depth gauge assembly 100 preferably comprises a threaded tab 102 and a first bolt 104 engaged in the threaded tab 102, such that the length of the bolt is adjustable relative to the tab 102. The first bolt 104 preferably has a disc-like tip 106 for contacting the floor of the cab of the vehicle in which this tool is installed. The tab 102 is connectional to the foot plate 26 by means of a second bolt 108 mounted in the hole 98. The tab 102 is sufficiently long for optionally positioning the depth gauge 100 on either sides of the foot plate 26 or immediately below the foot plate 26 for the purpose of adjusting the position of an accelerator pedal, a clutch pedal or a brake pedal.

Figures 10, 11:
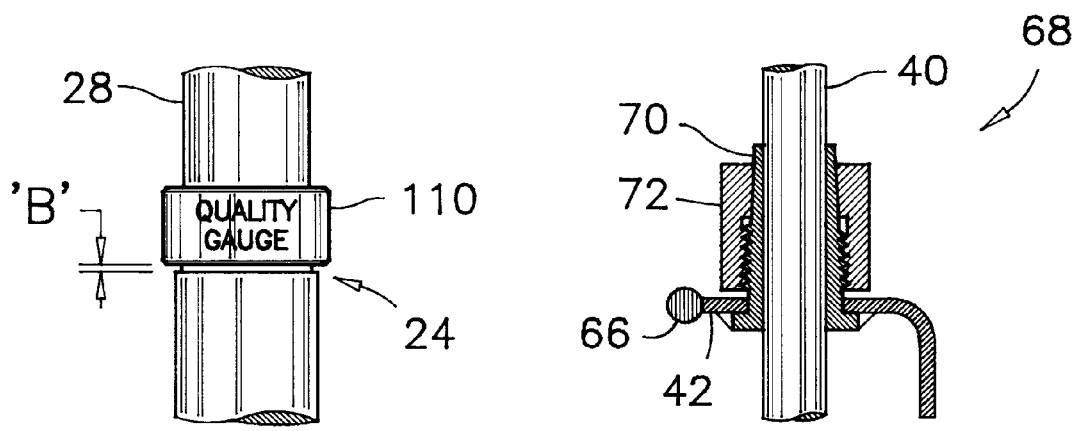
FIG. 10 is an enlarged partial side view of the brake pedal actuator, illustrating the positional friction ring used to monitor various defects in a braking system of a vehicle.
FIG. 11 is an enlarged cross-section view through the latch plate locking device.

Referring now to FIG. 10, there is illustrated therein a positional friction ring 110 which is mounted on the round stem 28 of the actuator of the preferred embodiment. The ring 110 is preferably made of plastic material and has an inside dimension which is a restrictive sliding fit over the round stem 28. The ring 110 is usable as a quality gauge for monitoring the quality of a brake job performed on a vehicle. The use of the quality gauge consists of simply pushing the ring 110 down against the near end 24 of the tubular member 20 after the last manipulation of the brake pedal with the actuator of the preferred embodiment. The ring 110 is left in this position for a nominal period of time, about the time required to a mechanic to re-installed a wheel and rim on a hub, to gather his/her tools and to lower the hoist on which the vehicle is set. During this nominal period, if a gap 'B' has developed between the positional friction ring 110 and the near end 24 of the tubular member 20, as illustrated in FIG. 10, the brake system is defective. Such gap 'B' indicates that there is improper creeping movement in the brake pedal, probably caused by an amount of air in a brake line making the brake pedal spongy, a leaking or opened bleeding valve on one of the brake pistons, a leaking brake piston, a leaking tube fitting or a worn seal on the master brake cylinder. Such gap 'B' is usable as a warning to suggest to a mechanic that he/she should re-verify the brake system entirely before closing the work order on that job. On the other hand if after a nominal period, there has been no movement in the brake pedal and the gap 'B' is non-existent, one can conclude that the brake job just performed is a quality job.

It will be appreciated that the use of the quality gauge 110 when performing a brake job on a vehicle, and when using the brake pedal actuator of the preferred embodiment, is advantageous for verifying the quality of the brake job and for preventing the release to a client of a vehicle having a faulty brake system.

While the above description provides a full and complete disclosure of the preferred embodiments of this invention, various modifications, alternate constructions and equivalents may be employed without departing from the true spirit and scope of this invention. Such changes might involve alternate components, structural arrangements, construction features or the like. Therefore, the above description and the illustrations should not be construed as limiting the scope of the invention which is defined by the appended claims.

What is claimed is:

1. A brake pedal actuator for use by auto-mechanics when bleeding an hydraulic brake system of a vehicle, comprising:

an elongated tubular member having a first closed end, a second opened end, and a foot plate affixed to said first closed end;

an elongated stem telescopically mounted inside said tubular member in said opened second end, said stem having at least one hole extending transversely through a mid-region thereof;

a compression spring mounted inside said tubular member between said foot plate and said stem for urging said stem towards said second opened end;

a J-shaped hook having a first bolt protruding therefrom, said first bolt being engaged in said hole through said stem;

a latching mechanism affixed to said tubular member and having a latch plate overlapping said foot plate for selectively retaining said foot plate to a brake pedal of a vehicle, and an elongated rod rigidly connected to said latch plate;

said tubular member also having guiding means connected thereto for movably guiding said elongated rod there-along, and said elongated rod being mounted in said guiding means such that a movement of said latch plate is controllable by moving said elongated rod relative to said tubular member;

a first handle affixed to said tubular member and extending perpendicularly from said tubular member; and a second handle affixed to said stem and extending perpendicularly from said stem;

whereby when said foot plate is held against a brake pedal of a vehicle, said second handle is usable for engaging said J-shaped hook with a steering wheel of said vehicle, and said first handle is usable by an auto-mechanic for manually pumping said brake pedal while standing outside said vehicle.

2. The brake pedal actuator as claimed in claim 1, wherein said latch plate has a U-shaped form defining a pair of finger-like tabs with each said tab being extendible behind a brake pedal, on a respective side of a brake pedal lever.

3. The brake pedal actuator as claimed in claim 1, wherein said latching mechanism comprises a coil spring connected to said rod and to said guiding means for urging said latch plate against said foot plate.

4. The brake pedal actuator as claimed in claim 3, wherein said latching mechanism further comprises a palm-type handle mounted on said rod and finger-gripping means mounted on said guiding means, and said finger-gripping means being at a distance from said palm-type handle of less than a hand's length.

5. The brake pedal actuator as claimed in claim 3, wherein said coil spring has a compressible length of about at least two inches (50 mm), and said latch plate is movable at least said compressible length.

6. The brake pedal actuator as claimed in claim 1, wherein said latching mechanism further comprises locking means affixed to said guiding means for selectively locking a position of said rod relative to said tubular member.

7. The brake pedal actuator as claimed in claim 6, wherein said locking means is a wedge-type lock having a taper nut threaded over a taper split sleeve enclosing said rod.

8. The brake pedal actuator as claimed in claim 1, wherein said compression spring has a compressible distance of about 8 inches (20 cm), and a spring rate of between about 5 to 7.5 lbs/inch (0.9–1.3 kg/cm).

9. The brake pedal actuator as claimed in claim 1, wherein said first bolt protruding from said J-shaped hook is loosely mounted in said hole and is longer than a diameter of said stem plus an engagement thereof in said second handle such that a mounting of said handle in said hole is a pivotal connection.

10. The brake pedal actuator as claimed in claim 1, wherein said at least one hole in said stem is a plurality of spaced-apart holes.

11. The brake pedal actuator as claimed in claim 1, wherein said tubular member further comprises a flat bar affixed thereto along a longitudinal axis thereof; said flat bar having a plurality of threaded holes therein, and said first handle is removably mounted in one of said threaded holes.

12. The brake pedal actuator as claimed in claim 1, wherein said compression spring is retained inside the tubular member by a screw threaded through said tubular member and extending between a bottom and second to bottom coils of said spring.

13. The brake pedal actuator as claimed in claim 1, wherein said J-shaped hook has an inside surface lined with soft padding material.

14. The brake pedal actuator as claimed in claim 1, wherein said stem comprises a guide sleeve on an end thereof, and said guide sleeve has an outside diameter which represents a sliding fit inside said tubular member.

15. A brake pedal actuator for use by auto-mechanics when bleeding an hydraulic brake system of a vehicle, comprising:
   an elongated tubular member having a first closed end, an opened second end and a foot plate affixed to said first closed end;
   an elongated stem telescopically mounted inside said tubular member in said opened second end; said stem having a plurality of spaced-apart holes therein;
   a compression spring mounted inside said tubular member between said foot plate and said stem for urging said stem towards said second opened end;
   a J-shaped hook adjustably mounted along said stem for engaging with a steering wheel of a vehicle; said J-shaped hook having a bolt protruding therefrom, said bolt being removably and loosely engaged in one of said holes, and
   at least one mark on said stem corresponding relative to said second end of said tubular member, to a remaining compression of said spring when said stem is engaged in said tubular member, such that a positioning of said J-shaped hook along said stem is doable while monitoring said remaining compression of said spring.

16. The brake pedal actuator as claimed in claim 15, further comprising a handle having a threaded hole therein engaged on said bolt.

17. The brake pedal actuator as claimed in claim 16, wherein a length of said bolt is more than a diameter of said stem plus a length of an engagement thereof in said handle.

18. The brake pedal actuator as claimed in claim 15, further comprising a latching mechanism affixed to said tubular member and having a latch plate overlapping said foot plate for selectively retaining said foot plate to a brake pedal of a vehicle.

19. The brake pedal actuator as claimed in claim 18, further comprising an elongated rod rigidly connected to said latch plate and said tubular member further comprising guiding means connected thereto for movably guiding said elongated rod there-along, and said elongated rod being mounted in said guiding means such that a movement of said latch plate is controllable by moving said elongated rod relative to said tubular member.

20. A brake pedal actuator for use by auto-mechanics when bleeding an hydraulic brake system of a vehicle, comprising:
   an elongated tubular member having a first closed end, a second opened end and a foot plate affixed to said first closed end;
   an elongated stem telescopically mounted inside said tubular member in said second opened end;
   a compression spring mounted inside said tubular member between said foot plate and said stem for urging said stem towards said second opened end;
   hooking means adjustably mounted along said stem for engaging with a steering wheel of a vehicle; and
   a ring movably mounted on said stem and being restrictively positional along said stem,
   such that when said brake pedal actuator is in use with said foot plate against a brake pedal of a vehicle and said hooking means engaged with a steering wheel of said vehicle, said ring is usable for monitoring a creeping movement of said brake pedal under a load from said compression spring.

* * * * *